United States Patent
Baggerman

(10) Patent No.: US 10,671,485 B2
(45) Date of Patent: Jun. 2, 2020

(54) IMAGE MANAGEMENT FOR DESKTOP VIRTUALIZATION

(71) Applicant: Nutanix, Inc., San Jose, CA (US)

(72) Inventor: Cornelis Hendrikus Baggerman, Den Dolder (NL)

(73) Assignee: NUTANIX, INC., San Jose, CA (US)

(*) Notice: Subject to any disclaimer, the term of this patent is extended or adjusted under 35 U.S.C. 154(b) by 224 days.

(21) Appl. No.: 15/476,485

(22) Filed: Mar. 31, 2017

(65) Prior Publication Data

US 2020/0089573 A1 Mar. 19, 2020

(51) Int. Cl.
| | |
|---|---|
| G06F 11/14 | (2006.01) |
| G06F 16/583 | (2019.01) |
| G06F 16/31 | (2019.01) |
| G06F 9/455 | (2018.01) |
| G06F 16/11 | (2019.01) |

(52) U.S. Cl.
CPC ...... *G06F 11/1451* (2013.01); *G06F 9/45558* (2013.01); *G06F 11/1464* (2013.01); *G06F 11/1484* (2013.01); *G06F 16/328* (2019.01); *G06F 16/583* (2019.01); *G06F 2009/45562* (2013.01); *G06F 2201/80* (2013.01); *G06F 2201/815* (2013.01); *G06F 2201/84* (2013.01)

(58) Field of Classification Search
CPC .. G06F 11/1451; G06F 16/583; G06F 16/328; G06F 11/1464; G06F 11/1484; G06F 9/45558; G06F 2201/84; G06F 2201/80; G06F 2009/45562; G06F 2201/815
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 8,898,411 B2 * | 11/2014 | Prahlad ............... G06F 11/1451 707/639 |
| 9,069,708 B2 | 6/2015 | Gill et al. |
| 9,626,252 B1 * | 4/2017 | Chopra ............... G06F 11/1458 |
| 9,772,866 B1 | 9/2017 | Aron et al. |
| 2012/0005673 A1 * | 1/2012 | Cervantes ........... G06F 9/45558 718/1 |

(Continued)

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Robert W Beausoliel, Jr.
*Assistant Examiner* — Mohammad Solaiman Bhuyan
(74) *Attorney, Agent, or Firm* — Foley & Lardner LLP

(57) ABSTRACT

The present embodiments relate generally to master image management for a virtualization environment such as a virtual desktop infrastructure. Some embodiments are directed toward using image snapshot technology to identify differences between master images. In these and other embodiments, a methodology includes indexing the contents of snapshots of the same master image taken at different points in time to determine the delta between the snapshots, and thus the states of the master image at the different points in time.

28 Claims, 4 Drawing Sheets

(56) References Cited

U.S. PATENT DOCUMENTS

| | | | |
|---|---|---|---|
| 2012/0284708 A1* | 11/2012 | Anderson, III | G06F 9/45558 718/1 |
| 2013/0067345 A1 | 3/2013 | Das et al. | |
| 2013/0332558 A1* | 12/2013 | Condict | G06F 3/0641 709/214 |
| 2014/0149695 A1 | 5/2014 | Zaslavsky et al. | |
| 2014/0258235 A1 | 9/2014 | Jin et al. | |
| 2014/0258238 A1 | 9/2014 | Jin et al. | |
| 2015/0132353 A1 | 5/2015 | Kikuchi et al. | |
| 2015/0154042 A1* | 6/2015 | Katayama | G06F 9/45533 718/1 |
| 2015/0269187 A1 | 9/2015 | Cho et al. | |
| 2015/0339149 A1 | 11/2015 | Tian et al. | |
| 2016/0034294 A1 | 2/2016 | Christenson et al. | |
| 2016/0041837 A1 | 2/2016 | Rangayya et al. | |
| 2016/0127307 A1* | 5/2016 | Jain | G06F 16/13 709/245 |
| 2016/0132353 A1 | 5/2016 | Jayachandran et al. | |

OTHER PUBLICATIONS

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 3, 2017), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

Cano, Ignacio, et al. "Curator: Self-Managing Storage for Enterprise Clusters" (Mar. 27, 2017), from https://www.usenix.org/conference/nsdi17/.

* cited by examiner

IMAGE MANAGEMENT FOR DESKTOP VIRTUALIZATION

TECHNICAL FIELD

The present embodiments relate generally to virtualization environment management and more particularly to master image management for a desktop virtualization infrastructure.

BACKGROUND

In a virtualization environment such as a virtual desktop infrastructure, a golden image or master image of a virtual desktop is configured and maintained typically by a system administrator, based on which a pool of cloned virtual desktops can be deployed. One challenge with such golden image or master image management is keeping track of the changes being made within a golden image. For Citrix and VMware installations, for example, a system administrator can go into the golden image and add applications or change settings without documenting such changes. When they create a snapshot, all the changes are stored for the next roll-out of the golden image, causing substantial risks in stability and usability of the virtual desktop clones, which can lead to substantial downtime. Some attempts at alleviating such problems include golden image automation applications such as Microsoft System Center Configuration Manager, RES One Automation, Microsoft MDT and Powershell. However, such applications don't prevent manual intervention or changes in the golden image, and they do not allow for the actual changes between sequential versions of a golden image to be identified.

SUMMARY

The present embodiments relate generally to master image management for a virtualization environment such as a virtual desktop infrastructure. Some embodiments are directed toward using image snapshot technology to identify differences between master images. In these and other embodiments, a methodology includes indexing the contents of snapshots of the same master image taken at different points in time to determine the delta between the snapshots, and thus the states of the master image at the different points in time. The delta can allow changes in operating system updates, installed applications and the like between different versions of the master image to be readily identified, thereby enhancing master image management.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, the present embodiments are directed toward using image snapshot technology to identify differences between master images. In embodiments, a methodology includes indexing the contents of snapshots of the same master image taken at different points in time to determine the delta between the snapshots, and thus the states of the master image at the different points in time.

Figure 1:
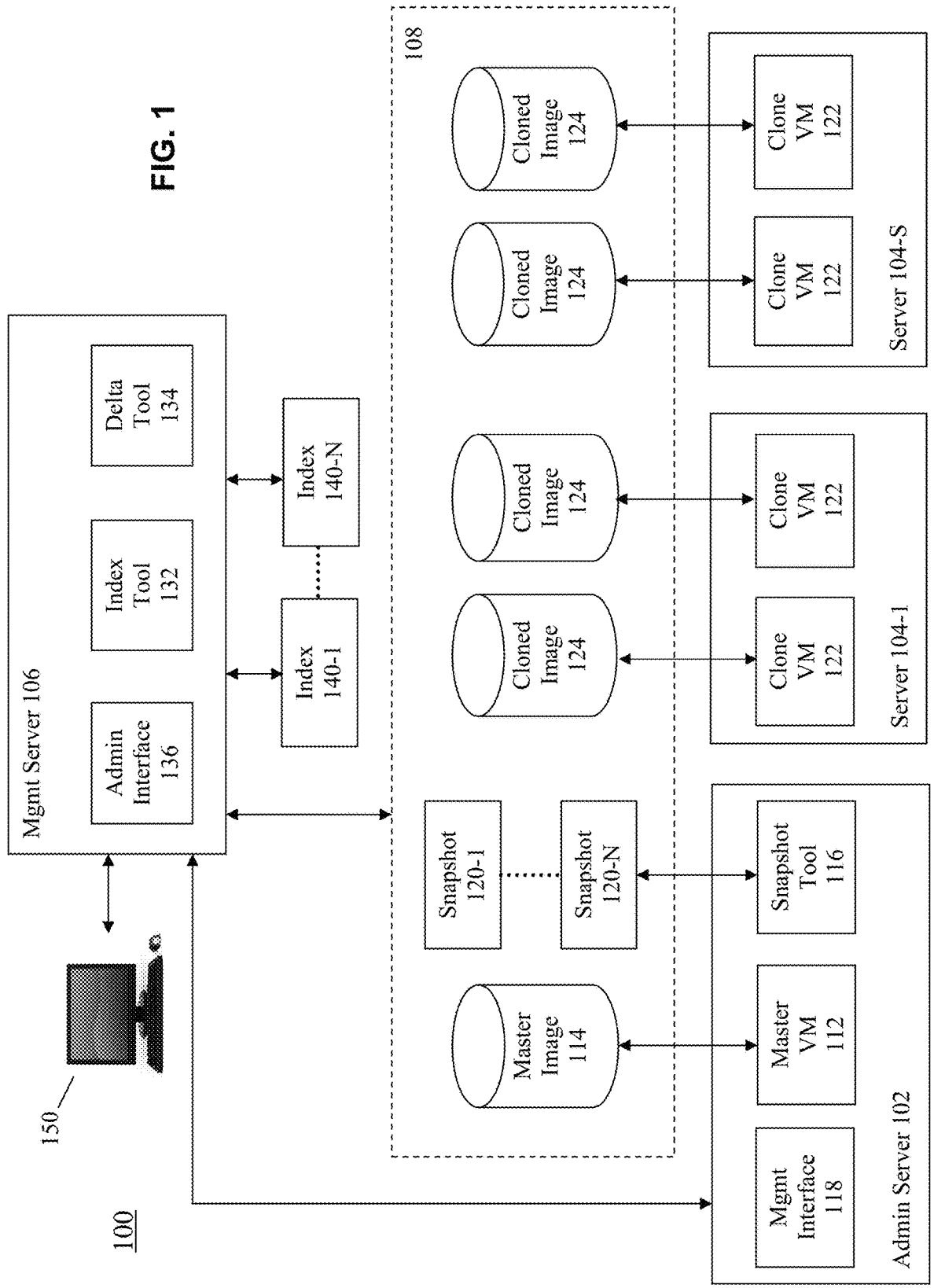
FIG. 1 is a block diagram of an example virtualization environment according to embodiments.

FIG. 1 is a block diagram of an example virtualization environment 100 in which the present embodiments can find useful applications.

As shown in FIG. 1, environment 100 includes a plurality of servers 102, 104 (e.g. NX-1000, NX-3000, NX-6000, NX-8000, etc. from Nutanix or server computers from Dell, Lenovo, Cisco, etc.) each having a hypervisor (e.g., ESXi from VMWare, AHV from Nutanix, XenServer from Citrix, etc., not shown) for running virtual machines (VMs). As is known, VMs are software-based implementation of a machine in an environment in which the hardware resources of a real computer (e.g., CPU, memory, storage, etc.) are virtualized or transformed by a hypervisor into the underlying support for the fully functional virtual machine that can run its own operating system and applications on the underlying physical resources just like a real computer. By encapsulating an entire machine, including CPU, memory, operating system, storage devices, and network devices, a virtual machine is completely compatible with most standard operating systems (e.g. Windows, Linux, etc.), applications, and device drivers. Hypervisors allow a single physical server computer to run multiple virtual machines, with each virtual machine sharing the resources of that one physical computer, potentially across multiple environments.

In the illustrated embodiment, servers 102, 104 include or run special VMs called service VMs (not shown) and/or otherwise implement distributed storage layer 108, for example as described in U.S. Pat. No. 8,601,473, the contents of which are incorporated herein by reference in their entirety. However, this is not necessary in all embodiments. An aspect of distributed storage layer 108 is that it provides access for each of servers 102, 104 (for example, all servers in a cluster) to the contents of all attached or embedded storage of servers 102, 104, as well as the contents of network attached storage (NAS) or cloud storage coupled to or in communication with one or more of servers 102, 104.

One possible application of a virtual machine is known as a virtual desktop. For example, rather than, or in addition to, providing individual desktop or notebook computers to all of its employees, each with their own individual installations of operating systems and application software, an organization may configure virtual machines operating on one or more server computers to run a standard operating system and common set of application software. The employees may then use computers with network access software and client applications (e.g. thin clients) to access these virtual machines and run the application software. An advantage of such virtual desktops or virtual desktop infrastructure (VDI) is that it can lower computing costs and improve the ability of organizations to efficiently manage resources and software configurations across an entire enterprise.

In VDI and other example applications according to the embodiments, virtualization environment 100 includes an administrator server 102. Administrator server 102 is configured to run a master VM 112 that is in turn used to configure master image 114. In a VDI example, the master VM 112 is used by an administrator to configure a master virtual desktop with a standard operating system and set of application software for all the virtual desktops in the organization. This standard set of operational software (e.g., line of business (LOB) applications) for the organization is stored in master image or golden image 114.

In these and other example applications according to the embodiments, environment 100 also includes any number of servers 104-1 ... 104-5. An administrator having control of the master VM 112 and master image 114 can create a pool of clone VMs 122 that run on servers 104-1 ... 104-S using one of any known and proprietary virtual environment techniques. The clone VMs 122 have clone images 124 based on the master image 114. In a VDI example, clone VMs 122 are virtual desktops that can be accessed by users (e.g. end user computers (EUC)) via a network and client computers, for example, to allow the users to execute the operating system and applications that the administrator has configured in the master image 114.

After a master image 114 has been created, an administrator can interact with or direct a snapshot tool 116 to take a snapshot 120 of the master image. As is known, a snapshot is a copy of the complete state and copy of the master VM 112 and master image 114 at a particular point in time, and can be used for disaster recovery and other useful applications. As further shown in the example of FIG. 1, a plurality of different snapshots 120-1 to 120-N can be saved, corresponding to different snapshots of the master VM 112 and master image 114 taken at different points in time, which can be further used for disaster recovery or other useful purposes for example. It should be noted that, although shown as being stored in storage layer 108, snapshots 120 may be hidden (e.g. in hidden directories) or otherwise not made accessible to clone VMs 122.

The present applicant recognizes several shortcomings of conventional approaches to master image or golden image management, including versions of master images that have corresponding snapshots. For example, assume a master image for an organization includes the Windows 7 operating system and all of the LOB applications for the organization. Further assume that at one point in time a system administrator installs Windows Updates and creates a snapshot of the master VM and master image. Based on the master image captured in this snapshot, a pool of virtual desktops gets created as set forth above. At a later point in time, for example when the system administrator is on vacation, a contractor steps in and needs to run Windows Update on the master VM. So, he starts the master VM using the previous master image captured in the previous snapshot and runs Windows Update, which changes the master image. However, assume that in the process of running Windows Update, the contractor accidentally updates the version of Java inside the master VM which further changes the master image. The contractor then stops the master VM without running any of the LOB applications and creates another snapshot of the master image, based on which he re-deploys the pool of virtual desktops. The next day the users of the organization call in with complaints that their LOB applications stopped working because of a mismatch in Java versions.

According to certain aspects, therefore, embodiments provide a mechanism that enable a comparison between the snapshots of a master image that have been made at different points in time so that deployment issues such as those described above can be easily identified and resolved. In accordance with these and other aspects, environment 100 includes an index tool 132 and an index delta tool 134. According to embodiments that will be explained in more detail below, index tool 132 can generate indexes 140 of snapshots 120, which can include the current operating system version and updates, application versions, etc. of the contents of snapshots 120. Index delta tool 134 can, upon request or automatically, compare the indexes 140 and deliver the differences between the indexes to an administrator, thereby allowing the administrator to more easily identify differences between versions of the master image 114 captured by snapshots 120. It should be noted that, although indexes 140-1 to 140-N are shown in this example as corresponding to each of snapshots 120-1 to 120-N, that this is not necessary in all embodiments. For example, indexes 140 may not even be stored for a given snapshot, but rather generated on an as-needed basis.

As shown in this example, index tool 132 and delta tool 134 are included in a management server 106 that includes console or other user interface functionality for allowing an administrator to request, perform and/or compare indexes 140 via I/O devices 150 (e.g. display, keyboard, mouse, etc.). Management server 106 can include a service VM as described above or otherwise has access to snapshots 120 in storage layer 108 for generating and comparing indexes 140. In this example, management server 106 includes an administrator interface 136 for communicating with a management interface 118 in administrator server 102. It should be noted, however, that not all embodiments include a separate administrator server 102 and management server 106, and that some or all the functionality of servers 102 and 106 can be included in the same server computer or even further distributed between different server computers. These and other alternatives will become apparent to those skilled in the art after being taught by the present disclosure.

Figure 2:
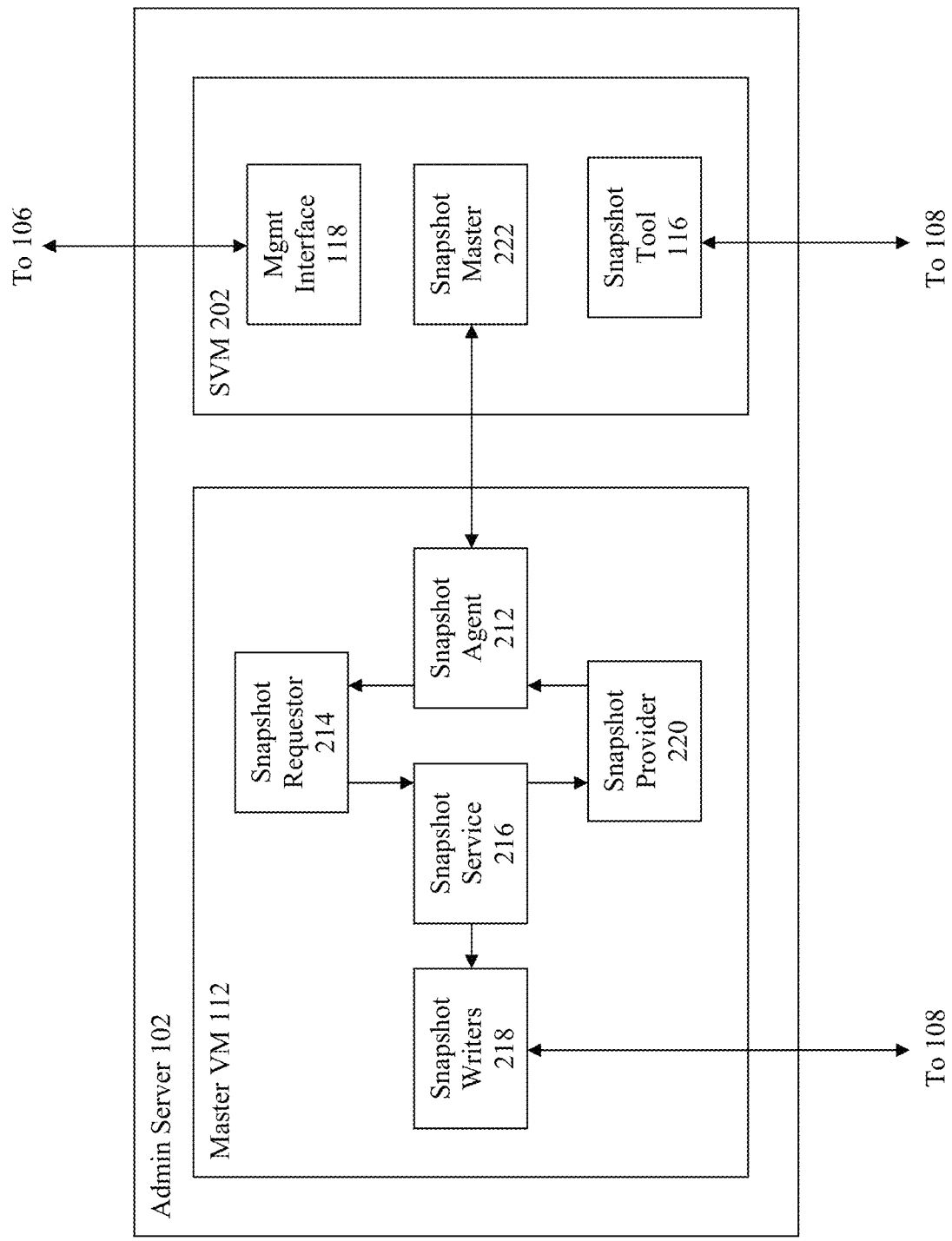
FIG. 2 is a block diagram of an example server running a master virtual machine having snapshot capabilities according to the embodiments.

FIG. 2 is a block diagram illustrating an example implementation of administrator server 102 according to embodiments.

As shown in this example implementation, administrator server 102 is configured to run master VM 112 and a service VM 202. In addition to running an operating system (e.g. Windows, Linux, etc.) and applications (not shown) that are intended to configure a master image 114, master VM 112 in this example runs a set of applications for allowing an administrator to create snapshots 120 as will be described in more detail below. The set of applications include a snapshot agent 212, a snapshot requestor 214, snapshot service 216, snapshot writers 218 and snapshot provider 220. As will become more apparent from the descriptions below, the configuration of master VM 112 with this set of applications, together with snapshot tool 116 provided in service VM 202, allows for "native" snapshots of master VM 112 and master image 114 to be created, which can provide several important advantages. However, the present embodiments are not limited to this example, and the principles herein can be extended to snapshots created using other mechanisms and configurations, including snapshots created using functionality incorporated in a hypervisor, for example.

More particularly in connection with "native" snapshot aspects of embodiments, in an example where master VM 112 executes a Windows operating system, snapshot service 216 can be implemented by the Microsoft Volume Shadow Copy Service (VSS) framework. The Volume Shadow Copy Service provides the backup infrastructure for the Microsoft Windows XP and Microsoft Windows Server 2003 operating systems, as well as a mechanism for creating consistent point-in-time copies of data known as shadow copies. The Volume Shadow Copy Service has native support for creating consistent shadow copies across multiple volumes, regardless of the snapshot technology or application. The Volume Shadow Copy Service can produce consistent shadow copies by coordinating with business applications, file-system services, backup applications, fast recovery solutions, and storage hardware. Several features in the Windows Server operating systems use the Volume Shadow Copy Service, including Shadow Copies for Shared Folders and Backup.

As further shown in this example implementation, management interface 118 and snapshot tool 116 are configured to run as applications in service VM 202. Service VM 202 is a VM that is also configured to allow an administrator to create snapshots of master VM 112 and master image 114 according to embodiments. It should be noted that this functionality of service VM 202 can be included along with other functionality not shown, such as functionality for implementing storage layer 108 as described in the incorporated patent referenced above. In one example embodiment, service VM 202 runs the Linux operating system, upon which run a set of applications including management interface 118 and snapshot tool 116. Snapshot tool 116 can be implemented by techniques described in U.S. Pat. No. 9,069,708, the contents of which are incorporated by reference herein in their entirety, to take application consistent snapshots in an hypervisor agnostic manner. In this example, the set of applications run by service VM 202 further includes a snapshot master application 222 for interacting with the set of applications in master VM 112 via snapshot agent 212 for creating snapshots as described in more detail below. In other embodiments, snapshot tool 116 can be implemented by, or similar to, backup software from providers such as CommVault and Rubrik.

An example sequence that can be implemented by master VM 112 and service VM 202 for taking snapshots according to embodiments will now be described in more detail. Those skilled in the art will understand how to implement software applications such as those shown in FIG. 2 and described herein after being provided these example functional details.

First, a user such as an administrator triggers a snapshot create operation. In connection with example embodiments such as those shown in FIG. 1, this can include receiving a request via a user interface such as that implemented by I/O devices 150 and console or other user interface functionality in management server 106. The request is forwarded to management interface 118 in service VM 202, for example via administrator interface 136 in management server 106. In response to the request, management interface 118 adds an out of band schedule in snapshot master 222. Snapshot master 222 creates a VM quiesce request and forwards this request to snapshot agent 212 running inside master VM 112. The snapshot agent 212 invokes the snapshot requestor 214 to take an application consistent snapshot via snapshot service 216. Pursuant to snapshot requestor 214, snapshot service 216 invokes snapshot writers 218 (e.g. Exchange/SQL) to quiesce the I/O of master VM 112. When the quiescing is complete, snapshot service 216 notifies snapshot hardware provider 220 to take the snapshot. Snapshot hardware provider 220 in turn calls back to snapshot master 222 via snapshot agent 212 to take the snapshot.

With master VM 112 having been quiesced as described above, snapshot master 222 takes a NFS snapshot 120 of master VM 112 and master image 114 using snapshot tool 116. Snapshot hardware provider 220 polls for the snapshot status from snapshot master 222 via snapshot agent 212. If snapshot master 222 detects that the operation of snapshot tool 116 is complete, snapshot provider 220 notifies snapshot service 216, in response to which snapshot service 216 will unfreeze the I/O on master VM 112.

Any suitable approach can be used by snapshot tool 116 to take the snapshot 120. For example, consider if the resources for master VM 112 are stored as virtual disks or "vdisk," which is a logical representation of storage space compiled from one or more physical underlying storage devices. A file comprises data within one or more vdisks that are associated with the file. Metadata may be used to map the resources (i.e. files and/or vdisks) to the underlying physical storage devices (e.g. hard drives, flash drives, etc.) in storage layer 108. When taking a snapshot, the vdisks associated with the master VM 112 are identified and all of the files in those vdisks are copied to snapshot 120.

It should be noted that, to avoid excessive delays or latency, snapshot 120 can initially be stored in flash or other storage locally at administrator server 102, and then moved to storage layer 108 later, for example in stages. It should be further noted that snapshot 120 can also be replicated at a remote site for further security, and/or stored in hidden directories or the like as mentioned above.

In a case where master VM 112 runs a Linux operating system instead of Windows, snapshot service 216 can be implemented by customized scripts. The sequence for performing snapshots is similar to the Windows sequence described above, except that instead of the Microsoft VSS framework, scripts are used. These scripts can be obtained from backup vendors like CommVault. However, customized scripts are also possible.

Figure 3:
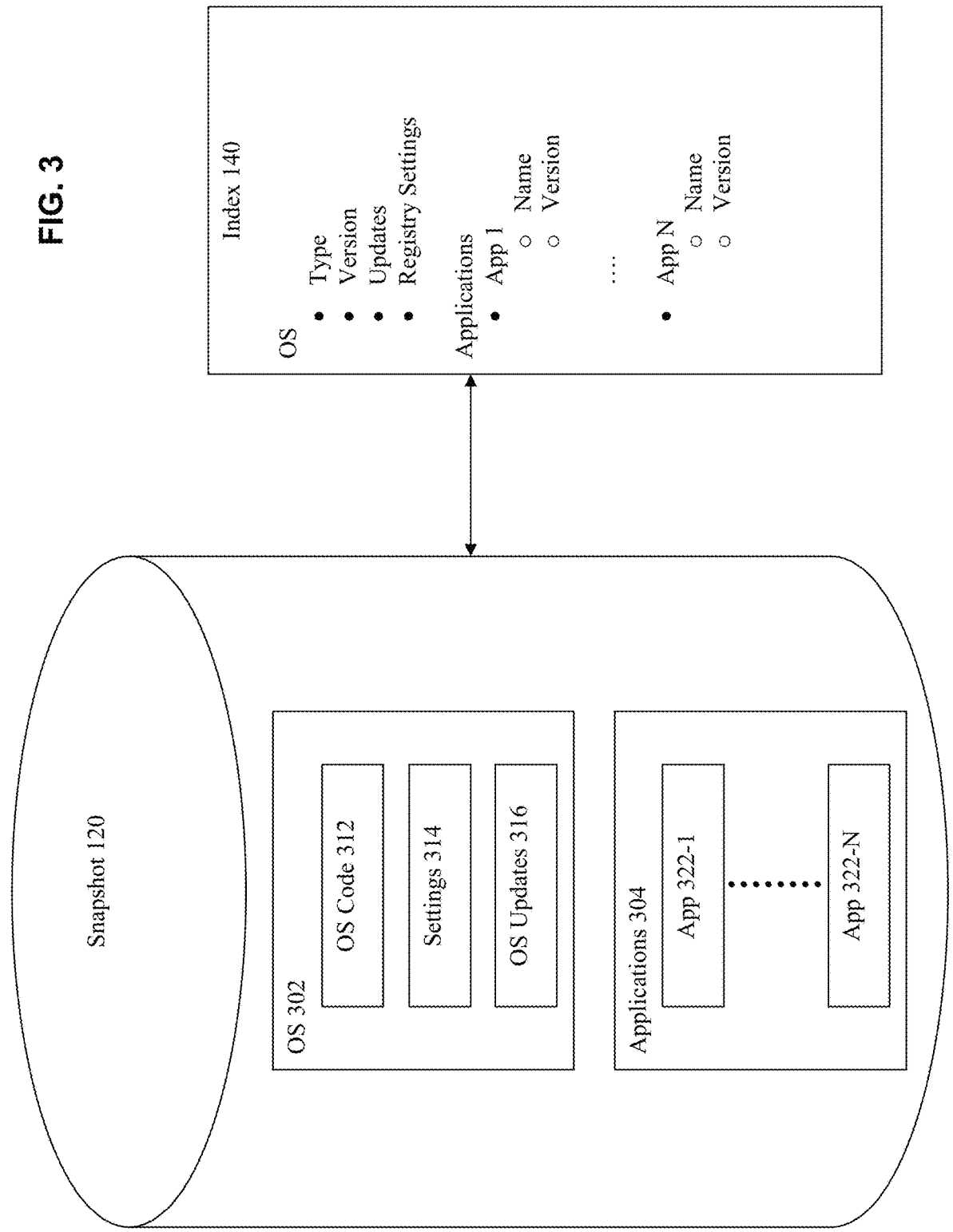
FIG. 3 is a block diagram illustrating an example snapshot and corresponding index according to embodiments.

As described above in connection with FIG. 1, according to embodiments, it is often desirable to be able to easily identify changes to snapshots of the same master image taken at different points in time. As also described above, embodiments include an index tool 132 that allow the contents of snapshots to be indexed. FIG. 3 is a diagram illustrating aspects of an example index of a snapshot according to embodiments.

As shown in FIG. 3, an example snapshot 120 that can be taken as described above in connection with FIG. 2 includes an entire copy of all the files in master image 114 at the time the snapshot was taken. This includes a copy of the operating system files 302 and application software files 304 in the master image 114.

Operating system files 302 according to example embodiments includes files containing the actual operating system executable code 312 (e.g. Windows operating system code), files containing settings 314 such as registry settings, and files containing operating system updates 316 (which, although shown separately for illustration purposes, may actually be included in code 312 and settings 314). It should be noted that operating system files 302 can include additional files, but further descriptions will be omitted here for the sake of clarity of the present embodiments.

Application software files 304 can include files 322-1 to 322-N for each of N applications in the master image 114. These files 322 can include files containing executable software for LOB applications such as Word, Excel, Outlook, etc., including any and all updates that have been downloaded or installed on the master VM 112 for these applications.

According to aspects of the embodiments, an administrator or system management application such as index tool 132 has access to snapshots 120 in storage layer 108, and thus the contents thereof, including operating system files 302 and application software files 304. However, the present applicant recognizes that just a directory listing of these files would not convey sufficient information about the state of the master image 114 captured in the snapshot 120. Accordingly, as shown in FIG. 3, based on the actual contents of a snapshot 120, index tool 132 can generate an index 140.

In this example shown in FIG. 3, index 140 includes information about the operating system and applications in snapshot 120. Although operating system files 302 and software files 304 include executable software that is in binary form and generally not human-readable, those skilled in the art will understand how they are structured and how certain information can be extracted from them. As shown in this example, this extracted information about the operating system in master image 114 from files 302 can include the operating system type (e.g. Windows XP, Windows 10, Red Hat Linux, etc.), its version, an identification of installed updates, and registry settings. Similarly, the extracted information about each of the N applications from files 304 can include the name of the application (Word, Excel, etc.) and the version number of the installed version of the application in master image 114.

Index 140 can be generated and maintained in any desired format considered useful for comparison, analysis or other purposes. For example, index 140 can be a database format, an XML file, text file, or any human-readable or non-readable format.

Figure 4:
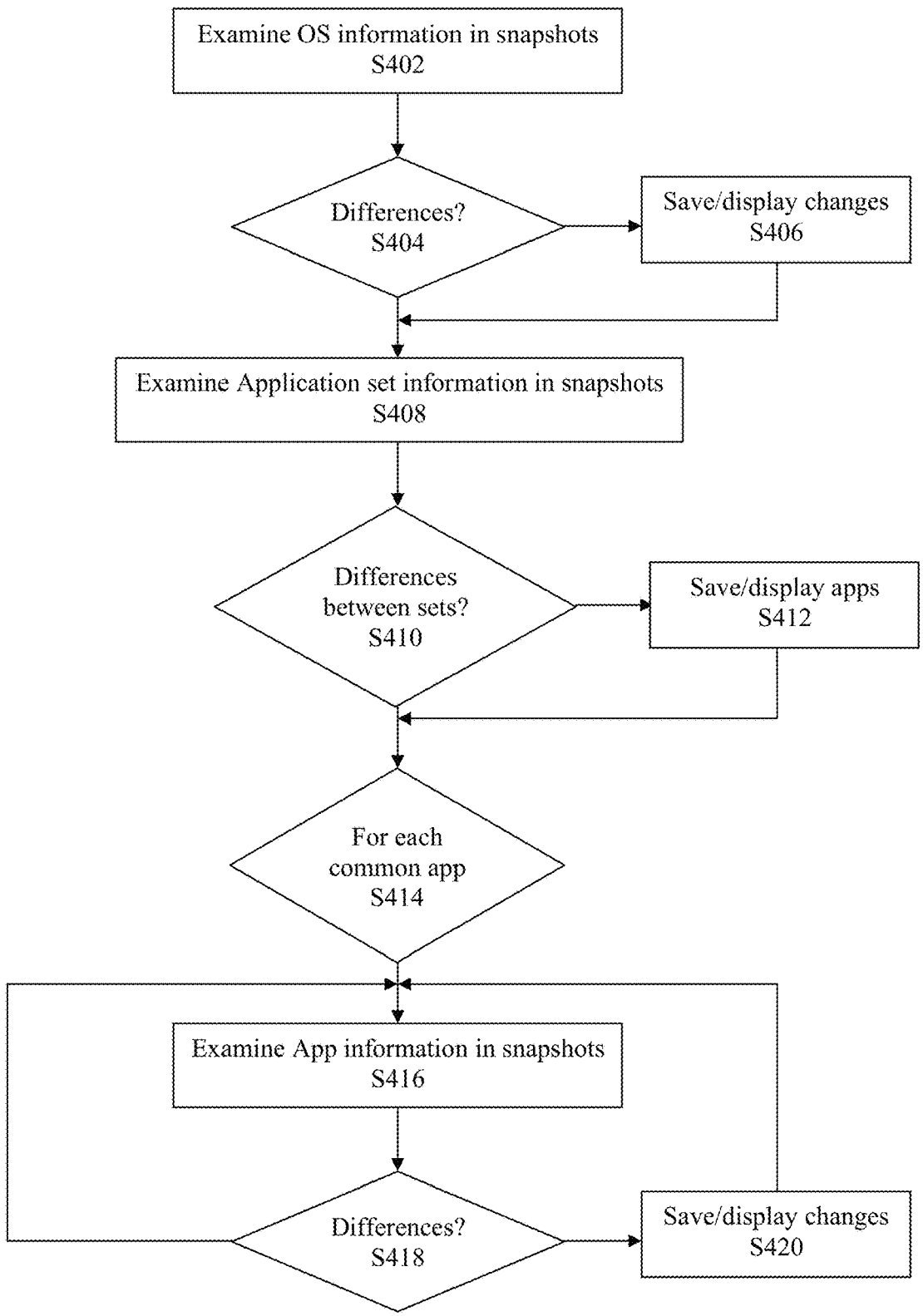
FIG. 4 is a flowchart illustrating an example index delta methodology according to the embodiments.

As set forth above, having the information about snapshots 120 of the same master image 114 taken at different points in time in respective indexes 140, a comparison between them can be made to identify any differences between the underlying master images 114. An example methodology executed by delta tool 134 according to embodiments is illustrated in the flowchart of FIG. 4. Those skilled in the art will be able to understand how to implement a delta tool 134 based on these descriptions.

Delta tool 134 can be executed at various times and in various ways. For example, in an example environment 100 such as that shown in FIG. 1, an administrator can access tool 134 via server 106 using a console or other user interface functionality and I/O devices 150. In these and other embodiments, the user interface can include functionality for searching for or otherwise identifying particular snapshots 120 of interest, as well as other information about the snapshots, the corresponding master images or master VMs, etc. Such user interface functionality can also include providing an administrator with the ability to select snapshots for comparison and displaying the results of the comparison. In other embodiments, delta tool 134 can be executed automatically and without separate administrator initiation, for example every time a new snapshot is requested. Those skilled in the art will appreciate various other alternatives after being taught by the present examples.

As shown in FIG. 4, in a first step S402, delta tool 134 examines information about the operating systems in respective indexes 140. This can include comparing the operating system version, the installed updates and the registry settings (e.g. using a diff utility or similar mechanism, perhaps depending on the format of the indexes 140). If there are any differences in this information as determined in step S404, these differences are noted and information about them are saved and/or displayed in step S406. Next in step S408, information about the applications in respective indexes 140 is examined by delta tool 134. First, in step S410 it is determined whether the number N of applications in the respective indexes 140 is different. If there are any differences in the number of installed applications, the individual different applications are identified (e.g. the name(s) of the application(s)) and this information is saved and/or displayed in step S412. Next, in step S414 for each of the common set of installed applications in the respective indexes 140, information about them is examined in step S416. If there are any differences between a single one of the common set of applications (e.g. version number, etc.), this information is saved and/or displayed in step S418.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method comprising:
   generating a second index based upon a content of a second snapshot, wherein the second snapshot is based on an image representing a configuration of a virtual machine; and
   upon generating the second index, comparing the second index with a first index generated from a first snapshot of the image captured before the second snapshot to identify a change in the configuration,
   wherein each of the first index and the second index comprises information about an operating system or application of the virtual machine.

2. The method of claim 1, wherein the content of the first snapshot and the second snapshot comprises the information about the operating system associated with the virtual machine, and wherein the first index and the second index extracts the information about the operating system from the first snapshot and the second snapshot, respectively.

3. The method of claim 1, wherein comparing the second index with the first index comprises determining a difference in a number of applications indicated in the first index and the second index.

4. The method of claim 1, wherein the content of the first snapshot and the second snapshot comprises the information about the application associated with the virtual machine, and wherein the first index and the second index extracts the information about the application from the first snapshot and the second snapshot, respectively.

5. The method of claim 1, wherein comparing the second index with the first index comprises determining a difference between the information about the operating system contained in the second index and the first index.

6. The method of claim 1, wherein for a first application indicated in both the first index and the second index, further comprising determining a difference in the first application indicated in the first index and the second index.

7. The method of claim 1, wherein the information about the operating system comprises at least one of an operating system type, an operating system version, an operating system update, or a registry setting.

8. The method of claim 1, wherein the information about the application comprises at least one of a name of the application and a version number of the application.

9. The method of claim 1, wherein each of the first index and the second comprises information about the operating system and the application of the virtual machine.

10. The method of claim 9, wherein the information about the operating system comprises at least one of an operating system type, an operating system version, an operating system update, or a registry setting, and wherein the information about the application comprises at least one of a name of the application and a version number of the application.

11. The method of claim 1, wherein the virtual machine is installed on a server, and wherein the first snapshot, the second snapshot, the first index, and the second index are generated on the server.

12. An apparatus comprising:
a processor to execute programmed instructions for:
identifying a first snapshot and a second snapshot of a virtual machine, wherein the first snapshot is captured at a first point in time and the second snapshot is captured at a second point in time different from the first point in time;
generating a first index based upon a content of the first snapshot;
generating a second index based upon the content of the second snapshot; and
comparing the first index with the second index to identify a change in a configuration of the virtual machine,
wherein each of the first index and the second index comprises information about an operating system or application of the virtual machine.

13. The apparatus of claim 12, wherein the virtual machine is a master virtual machine that is used to create a clone virtual machine comprising a virtual desktop.

14. The apparatus of claim 12, wherein the information about the operating system comprises at least one of an operating system type, an operating system version, an operating system update, or a registry setting.

15. The apparatus of claim 12, wherein the information about the application comprises at least one of a name of the application or the version number of the application.

16. The apparatus of claim 12, wherein each of the first index and the second comprises information about the operating system and the application of the virtual machine, wherein the information about the operating system comprises at least one of an operating system type, an operating system version, an operating system update, or a registry setting, and wherein the information about the application comprises at least one of a name of the application and a version number of the application.

17. An apparatus comprising:
a processor for executing programmed instructions to:
generate an index based upon a content of a snapshot, wherein the snapshot is based on an image representing a configuration of a master virtual machine; and
compare the index with another index created from a previously captured snapshot of the image to identify differences between the snapshot and the previously captured snapshot,
wherein each of the index and the another index comprises information about an operating system or application of the master virtual machine.

18. The apparatus of claim 17, wherein for the comparison, the processor:
determines that a number of applications indicated in the index is different from a number of the applications indicated in the another index; and
upon determining that the number of the applications indicated in the index is different from the number of the applications indicated in the another index, identifies a name of the applications that are different between the index and the another index.

19. The apparatus of claim 17, wherein for the comparison, the processor determines a difference in the information about the operating system between the index and the another index.

20. The apparatus of claim 17, wherein the information about the operating system comprises at least one of an operating system type, an operating system version, an operating system update, or a registry setting.

21. The apparatus of claim 17, wherein the information about the application comprises at least one of a name of the application and a version number of the application.

22. The apparatus of claim 17, wherein the index is created from the snapshot captured at a first time, and wherein the another index is created from the another snapshot captured at a second time that is different from the first time.

23. The apparatus of claim 17, wherein the processor creates the snapshot by quiescing I/O of the master virtual machine.

24. The apparatus of claim 17, wherein the snapshot and the index are generated on a server on which the master virtual machine is installed.

25. A non-transitory computer-readable media comprising computer-readable instructions stored thereon that when executed by a processor cause the processor to:
generate a first index based on a content of a first snapshot of a virtual machine;
generate a second index based upon the content of a second snapshot of the virtual machine; and
compare the second index with the first index to identify a change in a configuration of the virtual machine,
wherein each of the first index and the second index comprises information about an operating system or application of the virtual machine.

26. The non-transitory computer-readable media of claim 25, wherein the information about the operating system comprises at least one of an operating system type, an operating system version, an operating system update, or a registry setting.

27. The non-transitory computer-readable media of claim 25, wherein the information about the application comprises at least one of a name of the application and a version number of the application.

28. The non-transitory computer-readable media of claim 25, wherein each of the first index and the second comprises information about the operating system and the application of the virtual machine, wherein the information about the operating system comprises at least one of an operating system type, an operating system version, an operating system update, or a registry setting, and wherein the information about the application comprises at least one of a name of the application and a version number of the application.

* * * * *